Patented Nov. 14, 1950

2,529,566

UNITED STATES PATENT OFFICE 2,529,566

GLASS BONDED INSULATING COMPOSITION

Albert J. Monack, Rutherford, N. J., assignor to Mycalex Corporation of America, Clifton, N. J., a corporation of New Jersey No Drawing. Application August 17, 1948, Serial No. 44,791

2 Claims. (Cl. 106—53)

The present invention is directed to electrical insulating compositions. More particularly to a type wherein a readily fusible glass acts as a bonding agent for an insulating material such as mica. Compositions of this general type are known and they are obtained by molding under heat and pressure a powdered mixture comprising a low melting glass frit as a binder and powdered mica. The glass frit which is employed must melt at a low enough temperature to fuse and bind the mica particles without destroying or dissolving any substantial proportion of the mica. Since the mica is itself a rather soft mineral and since the glass or frit is low melting, the product can be machined or ground to very close tolerances.

Two processes have been employed for producing intricate shapes and forms from the powdered mixture of frit and mica. One process involves a direct molding step in which the product is formed into the final shape in the molding operation. This process is of particular value when small parts are to be made. In another process a plate or blank is first molded and this plate or blank is afterwards machined to produce the desired product. This latter process is of particular value for the manufacture of parts containing holes or threaded portions or any product where a very close tolerance is required.

Products of the previously known type, while possessing good insulating properties, are not capable of use where an extremely high insulating composition is desired. Attempts to improve the insulating properties of this material have not resulted in a sufficiently high degree of insulating value to enable the same to be used in certain special applications.

An object of the present invention is to provide a composition which is particularly adapted for molding to the close tolerances.

Another object of the invention is to provide a composition which has very high insulating values and which is particularly adapted for molding and thereafter machining to close tolerances.

Another object of the invention is to provide a composition which when molded has a low power factor, and very low loss factor at high frequencies and which composition is particularly adapted for molding and thereafter machining at close tolerances. The molded products have the same valuable insulating characteristics in hot moist air or in snow or ice. The molded products are substantially unaffected by changes in temperature and humidity.

These objects and others ancillary thereto are obtained by combining powdered mica and an alkali-lead-borate glass frit. The glass frit is made from alkali carbonates, cryolite, a lead oxide and boric acid or an alkali borate.

The alkali carbonates employed in the frit are of potassium, sodium and/or lithium. The alkaline earth carbonates employed in this frit are of barium, strontium and/or calcium.

The borate radical may be obtained from boric acid or from the alkali borate. When the alkali borate is added the corresponding alkali carbonate is reduced accordingly.

The lead which is employed is preferably litharge but it is obvious that any of the lead oxides may be employed as long as the proportion of lead is maintained within the required limits.

The following table shows the limits of the various compositions.

Table 1

|  | High alkali per cent | Preferred (per cent) | Low alkali per cent |
|---|---|---|---|
| Cryolite | 13 | 10 | 7 |
| Alkali carbonates | 14 | 11 | 6 |
| Alkaline Earth carbonates | 6 | 6 | 6 |
| Boric acid | 41 | 39 | 36 |
| Litharge (PbO) | 26 | 34 | 45 |

A powder having a composition within the ranges set forth in Table 1 is mixed with powdered mica to produce the molding composition of the present invention. The powdered mica is added to make up 40–70% of the total composition.

The product is produced from these combinations by molding under pressure of approximately 5000 pounds per square inch when the composition is maintained at a temperature of 1200 to 1350° F. and the molding chamber is maintained at a temperature of 700–900° F. This product has a specific gravity of about 3.0, a softening temperature of 400 to 425° C., a thermal conductivity of approximately 3.8 B. t. u. per square foot per inch per hour per degree F. The coefficient of thermal expansion is approximately $105 \times 10^7$ per degree centigrade. The dielectric constant of the product shows little change over the frequency range of 50 kilocycles to 10 megacycles. It has a dielectric strength for ¼ inch thickness of 600 volts per mil. The products can be molded and/or machined to very close tolerances. For example, thicknesses on flat plates up to about 50 square inches in area can be ground to plus or minus one thousandth of an inch. Rod diameters can be ground to a thousandth of an inch. Drilled holes can be held to plus or minus three thousandths of an inch. Hole spacings can be held to less than plus or minus five thousandths of an inch.

The novel features characteristic of this invention are set forth with particularity in the appended claims. The invention itself, however, both as to its organization and its method of operation, together with additional objects and advantages thereof, will best be understood from the following example:

*Example 1*

A mixture is made of the following constituents in certain proportions by weight as follows:

|  | Per cent |
|---|---|
| Cryolite | 10 |
| Barium carbonate | 6 |
| Sodium carbonate | 6 |
| Potassium carbonate | 5 |
| Boric acid | 39 |
| Litharge (PbO) | 34 |

The mixture is placed in a suitable furnace and subjected to a sufficiently high temperature to melt the ingredients whereby reaction takes place between the acid and alkaline constituents to form a clear glass, the cryolite present acting as a flux and being dissolved in the glass. The latter is poured into cold water whereby it is suddenly chilled and breaks up into small irregularly shaped fragments. It is then ground in a suitable mill to a fine powder, usually of a size averaging 200 mesh.

Mica is ground to about 200 mesh and is thoroughly mixed with the ground glass in approximately equal proportions by weight. To the mixture a small amount of water, usually not over 10% by weight of the mixture, is added and uniformly incorporated therein. The moist mixture is then compressed into preformed pellets or other shape and then subjected to pressure or transfer, or injection molding, or the powdered mixture may be directly molded to form sheets.

Numerous tests have been made which indicate the superiority of the present product over the prior art. Tests were made wherein a product made in accordance with the prior art process set forth above was compared under identical conditions with a product made in accordance with a product made according to the present invention. The samples of each of the products was immersed in water for 48 hours at room temperature, and thereafter they were tested for electrical properties. The following results were obtained:

|  | Prior Art | Present Invention |
|---|---|---|
| Power Factor, 1 megacycle | 0.0043 | 0.0018 |
| Dielectric constant, 1 megacycle | 6.5 | 7.4 |
| Loss Factor, 1 megacycle | 0.028 | 0.0133 |

The mechanical characteristics of the product are equal to those of the prior art. In another test the prior art and present products were subjected to a temperature of 85° F. at 85% relative humidity for a period of 96 hours. The surface resistance of the prior art product after this treatment was 100 megohms, whereas that of the present product was 300,000 megohms.

I claim:

1. An electrical insulating composition consisting of a disperse phase comprising 40–70% by weight of finely divided mica powder and a low melting glass bonding medium made by fusing a composition consisting essentially of 7–13% of cryolite, 6–14% of alkali carbonates selected from the group consisting of sodium, potassium and lithium carbonates, 6% of alkaline-earth carbonates selected from the group consisting of barium, strontium and calcium carbonates, 36–41% of boric acid and 45–26% of lead oxide calculated at PbO.

2. A composition of matter adapted to be molded at temperatures of 1200° to 1350° F. into a coherent body which is machinable and which body has high electrical insulating values, said composition comprising 40–70% of powdered mica and the remainder being a finely divided bonding mix consisting essentially of 7–13% of cryolite, 6–14% of alkali carbonates selected from the group consisting of sodium, potassium and lithium carbonates, 6% of alkaline earth carbonates selected from the group consisting of barium, strontium and calcium carbonates, 36–41% of boric acid and 45–26% of lead oxide calculated as PbO.

ALBERT J. MONACK.

REFERENCES CITED

The following references are of record in the file of this patent:

UNITED STATES PATENTS

| Number | Name | Date |
|---|---|---|
| 2,400,337 | Buechner | May 14, 1946 |

FOREIGN PATENTS

| Number | Country | Date |
|---|---|---|
| 569,222 | Great Britain | 1945 |